US012660750B2

(12) United States Patent　　　(10) Patent No.:　US 12,660,750 B2

White et al.　　　　　　　　　　(45) Date of Patent:　Jun. 23, 2026

(54) CONVERTIBLE MOWER

(71) Applicant: BLACK & DECKER INC., New Britain, CT (US)

(72) Inventors: Daniel J. White, Baltimore, MD (US); Matthew J. Velderman, Baltimore, MD (US); Matthew Stanton, Rockville, MD (US)

(73) Assignee: BLACK & DECKER INC., New Britain, CT (US)

( * ) Notice: Subject to any disclaimer, the term of this patent is extended or adjusted under 35 U.S.C. 154(b) by 385 days.

(21) Appl. No.: 18/225,885

(22) Filed: Jul. 25, 2023

(65) Prior Publication Data

US 2023/0371428 A1　　Nov. 23, 2023

Related U.S. Application Data

(63) Continuation of application No. 16/126,168, filed on Sep. 10, 2018, now Pat. No. 11,744,175.

(60) Provisional application No. 62/557,313, filed on Sep. 12, 2017.

(51) Int. Cl.
　　*A01D 34/82*　　　(2006.01)
　　*A01D 34/68*　　　(2006.01)
　　*A01D 34/69*　　　(2006.01)
　　*A01D 101/00*　　(2006.01)

(52) U.S. Cl.
　　CPC ....... *A01D 34/824* (2013.01); *A01D 34/6806* (2013.01); *A01D 34/69* (2013.01); *A01D 2034/6843* (2013.01); *A01D 2101/00* (2013.01)

(58) Field of Classification Search
　　CPC .. A01D 34/824; A01D 34/6806; A01D 34/69; A01D 34/6843; A01D 2101/00; A01D 34/90; A01D 34/902
　　See application file for complete search history.

(56) References Cited

U.S. PATENT DOCUMENTS

| 5,406,778 | A | * | 4/1995 | Lamb | ...................... | A01D 34/44 |
| | | | | | | 56/11.9 |
| 5,517,809 | A | * | 5/1996 | Rich | .................. | A01D 34/6806 |
| | | | | | | 56/2 |
| 6,499,282 | B1 | * | 12/2002 | Velke | ................. | A01D 34/6806 |
| | | | | | | 56/14.7 |
| 2013/0111865 | A1 | * | 5/2013 | Hansen | ................ | A01D 34/828 |
| | | | | | | 56/11.3 |
| 2019/0141889 | A1 | * | 5/2019 | Fisher | .................... | A01D 34/66 |
| | | | | | | 56/10.7 |
| 2019/0166758 | A1 | * | 6/2019 | Phillip | ................... | A01D 34/82 |

* cited by examiner

*Primary Examiner* — Brad Harcourt

(74) *Attorney, Agent, or Firm* — Mannava & Kang, P.C.

(57)　　　　　　ABSTRACT

The present invention is directed to a small push-type lawn mower that can be converted into a riding mower. The mower includes a platform at the rear of the mower deck, and its handle assembly that can be pivoted forward making room for a user to step onto the platform. The handle assembly includes controls that drive electric motors that power the rear wheels allowing the user to ride the mower. The handle assembly can be pivoted rearwardly so that the user can access and grab the handle assembly and push the mower as is well known.

19 Claims, 15 Drawing Sheets

FIG. 6A                    FIG. 6B

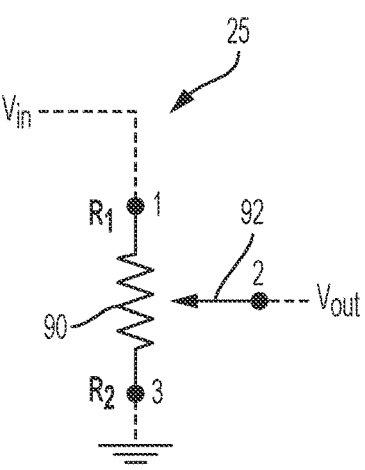
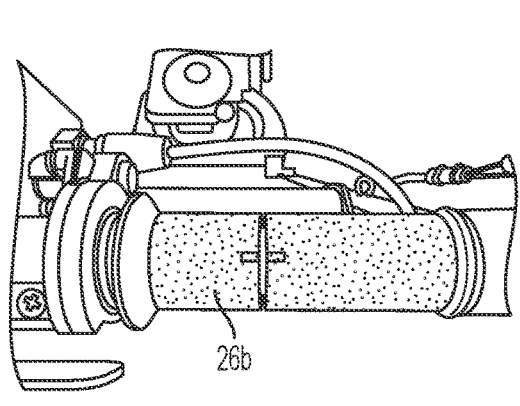
FIG. 10A
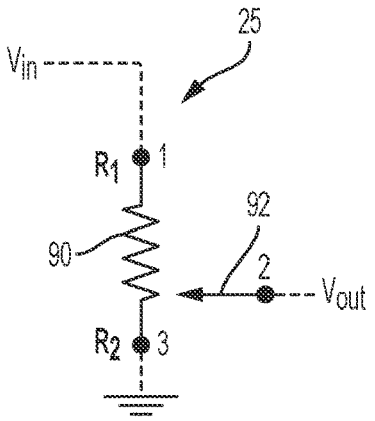
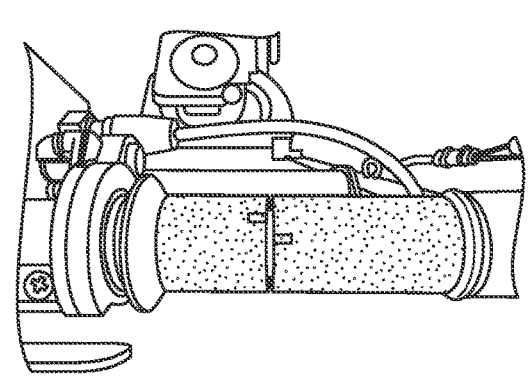
FIG. 10B
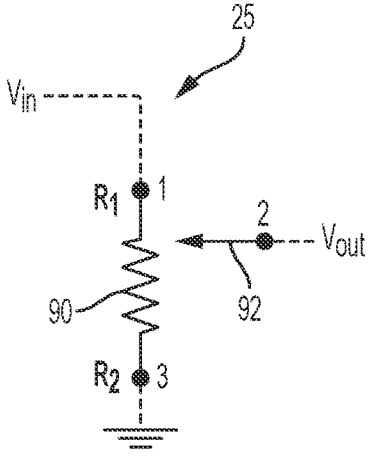
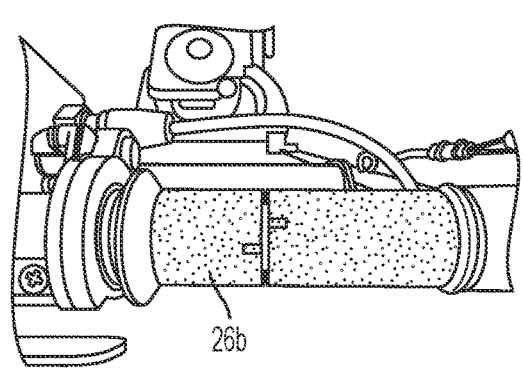
FIG. 10C

CONVERTIBLE MOWER

CROSS-REFERENCE TO RELATED APPLICATION

The present application is a continuation of US Patent Application Ser. No. 16/126,168, filed Sep. 10, 2018, entitled "Convertible Mower" and This application claims priority to provisional application 62/557,313 filed on Sep. 12, 2017.

FIELD OF THE INVENTION

This invention is directed to powered lawn mowers or other wheeled vegetation cutting device.

BACKGROUND OF THE INVENTION

Residential mowers generally come in two main types. The first is a push mower for smaller lawns and the second is a riding mower for larger lawns. Often users find themselves in between these two solutions and end up with long mow times with a push mower or large riding mowers they can't store and are expensive. Some user's simply hire a lawn service to avoid these issues. Therefore, it would be desirable to have a smaller push-type mowers for mowing smaller yards that a user could ride.

BRIEF SUMMARY OF THE INVENTION

Therefore, the present invention discloses a push-type mower that is convertible from a push mode to and ride mode.

BRIEF DESCRIPTION OF THE INVENTION

Further features and advantages of the present invention will be better understood by reference to the following description, which is given by way of example and in association with the accompanying drawings, in which:

FIG. 10A is a view of a potentiometer for the throttle position of FIG. 9A;

FIG. 10B is a view of a potentiometer for the throttle position of FIG. 9B;

FIG. 10C is a view of a potentiometer for the throttle position of FIG. 10C;

DETAILED DESCRIPTION OF THE INVENTION

Figure 1:
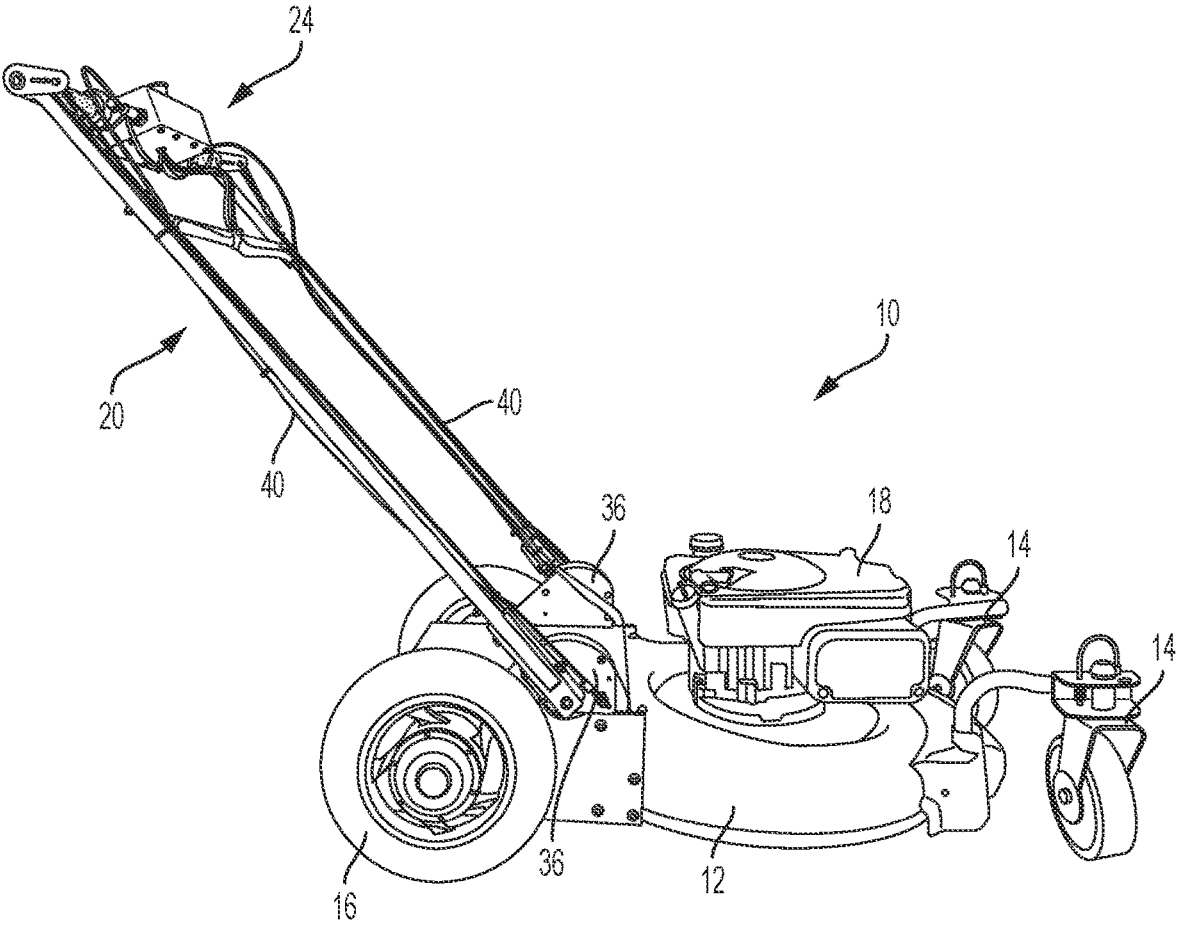
FIG. 1 is a right side view of a lawn mower in the walk mode according to the present invention.
Figure 11:
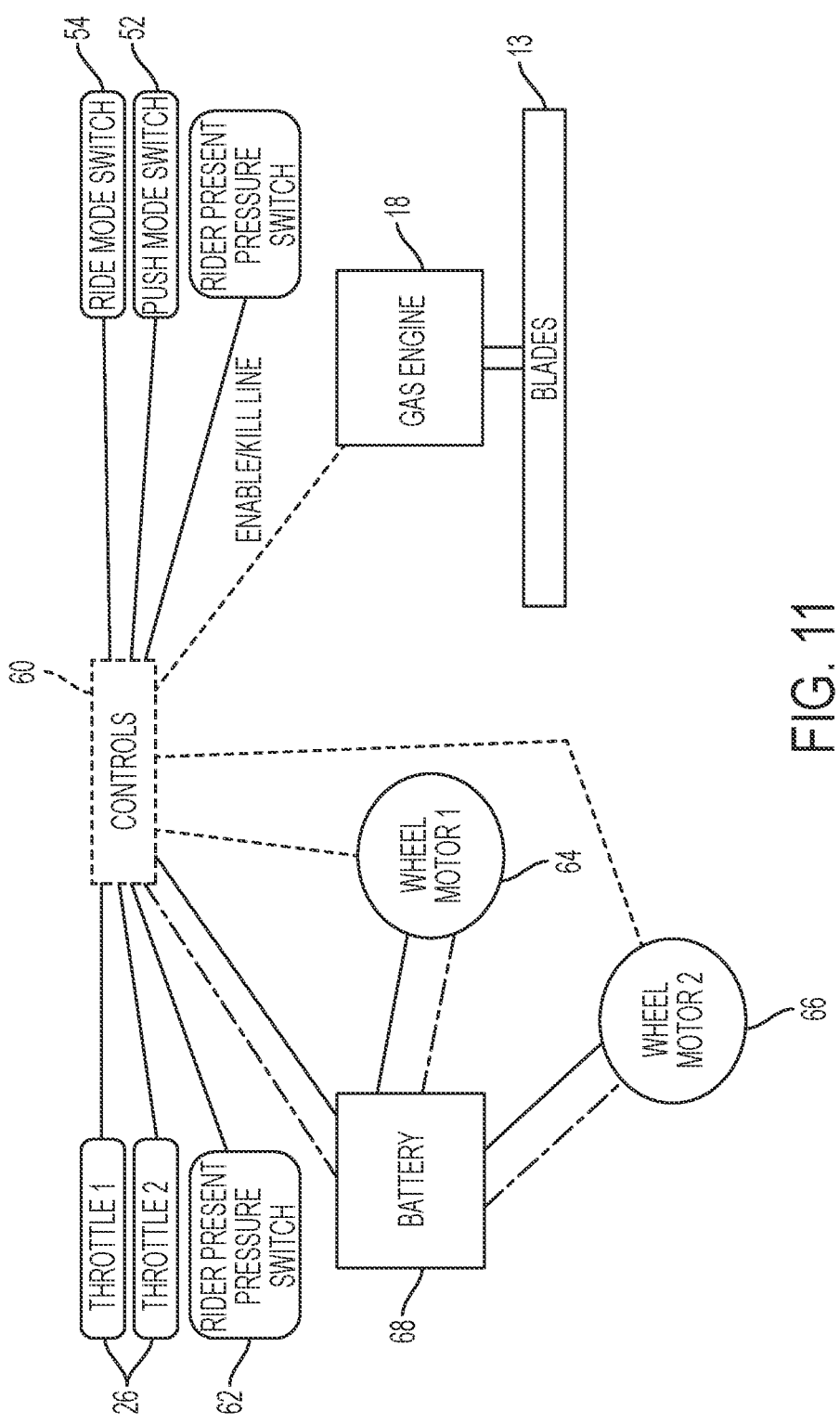
FIG. 11 is a flow diagram showing the controls for a gas engine embodiment of the mower.
Figure 12:
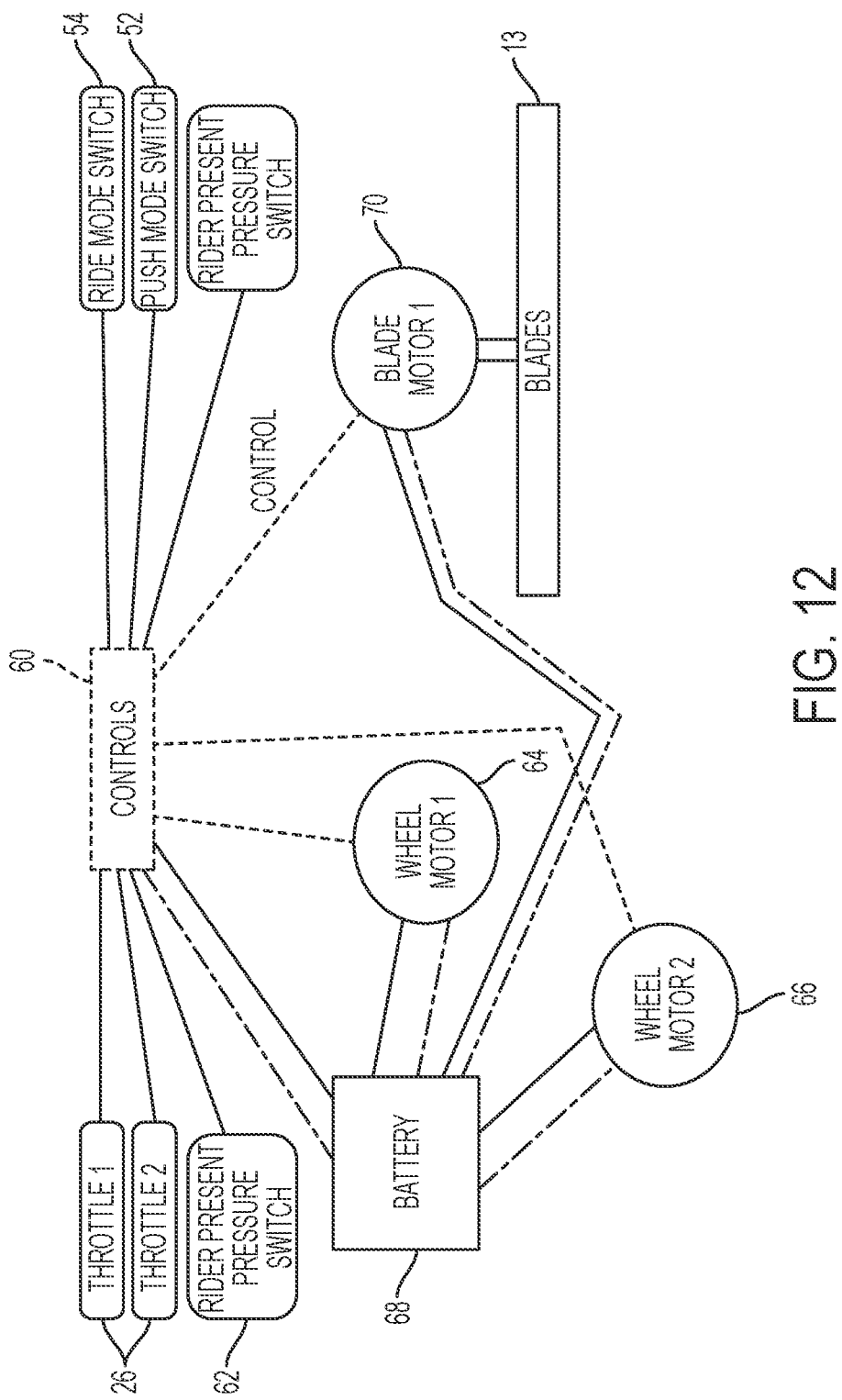
FIG. 12 is a flow diagram showing the controls for an electric motor embodiment of the mower.

FIG. 1 shows the mower of the present invention. The mower has a deck 12 that houses a cutting blade 13 (shown in FIGS. 11 and 12) therein. Two caster type front wheels 14 are secured at the front of the deck 12, and two rear wheels 16 powered by electric motors 64 and 66 (shown in FIGS. 11 and 12) are attached at the rear of the deck 12. An engine 18 is shown secured on top of the deck and is operatively connected to the blade to cut the grass or vegetation. It should be understood that although a gas engine is shown, any type of engine or electric motor can be used to power the blades and still fall within the scope of the invention. The term "motor" itself shall refer to combustion engines, electric motors or any other source of motive power. For example, FIG. 11 shows the various controls of the mower incorporating a gas engine while FIG. 12 shows and embodiment of the invention incorporating an electric motor. Extending rearwardly from the deck is a handle assembly 20.

Figure 2:
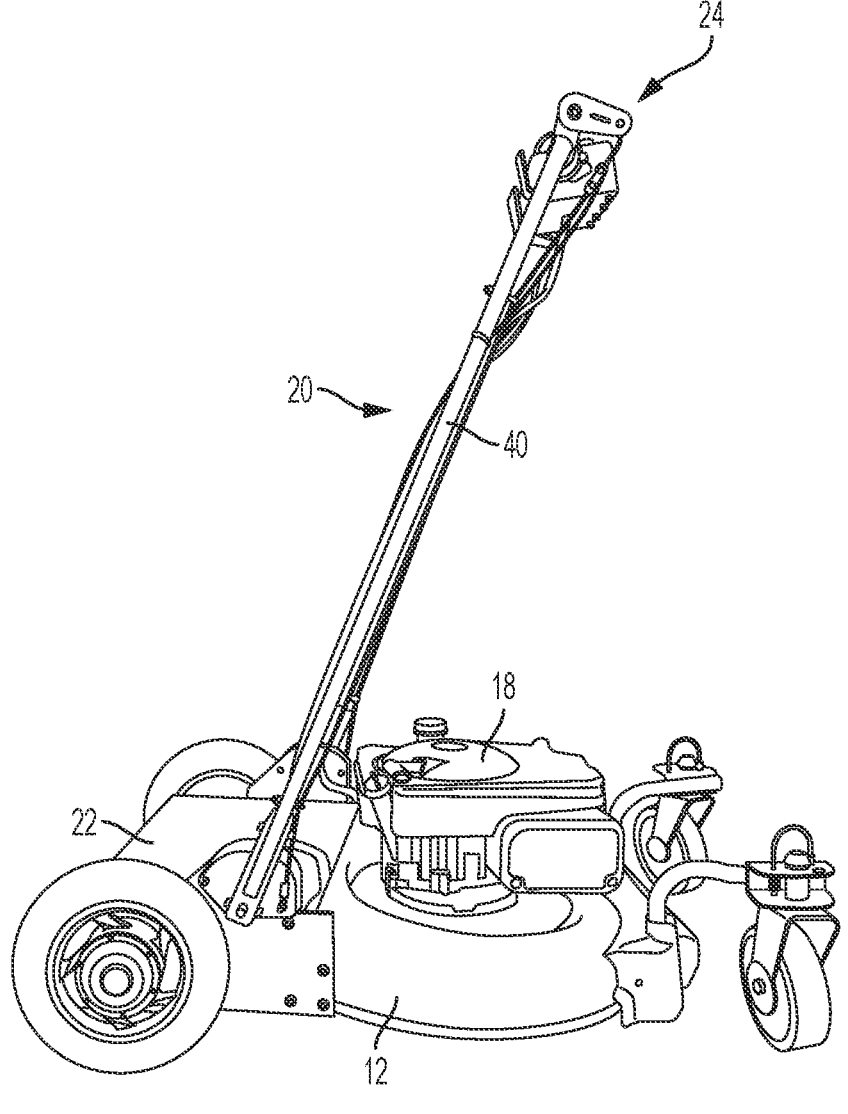
FIG. 2 is a right side of the mower of FIG. 1 in the ride mode.
Figure 8A:
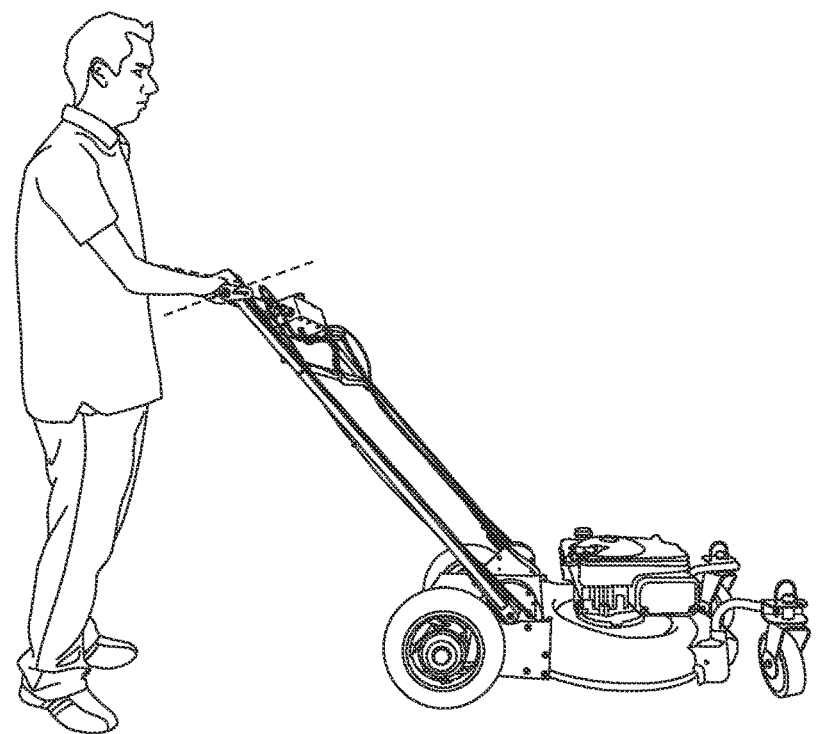
FIG. 8A is a view of the mower with a user in the push mode.
Figure 8B:
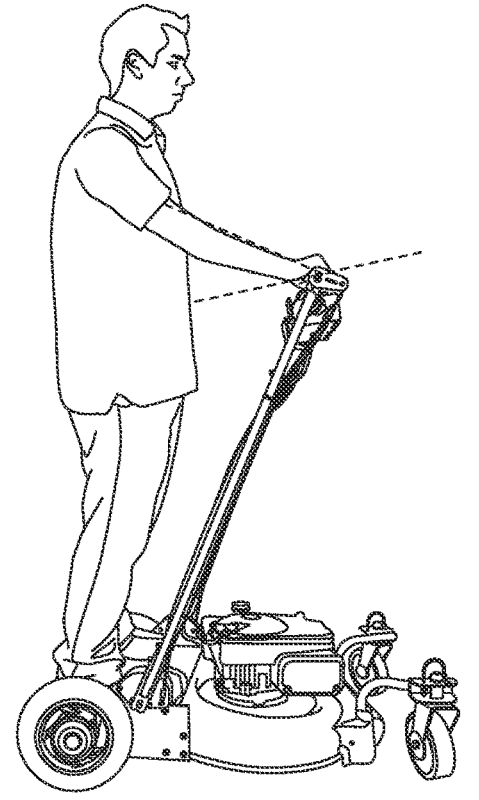
FIG. 8B is a view of the mower with a user in the ride mode.

Still referring to FIG. 1, the mower is shown in a walk mode, whereby a user holds the handle assembly 20 to walk behind the mower. FIG. 2 shows the mower in the riding mode where the handle assembly 20 has been pivoted forward, exposing a platform 22 at the rear of the deck for a user to stand on. The platform 22 can include small bumps or be coated with a material to prevent slippage. FIGS. 8A and 8B shows the mower with a user in the two modes to further clarify the operative positions of the handle assembly 20.

Figure 3:
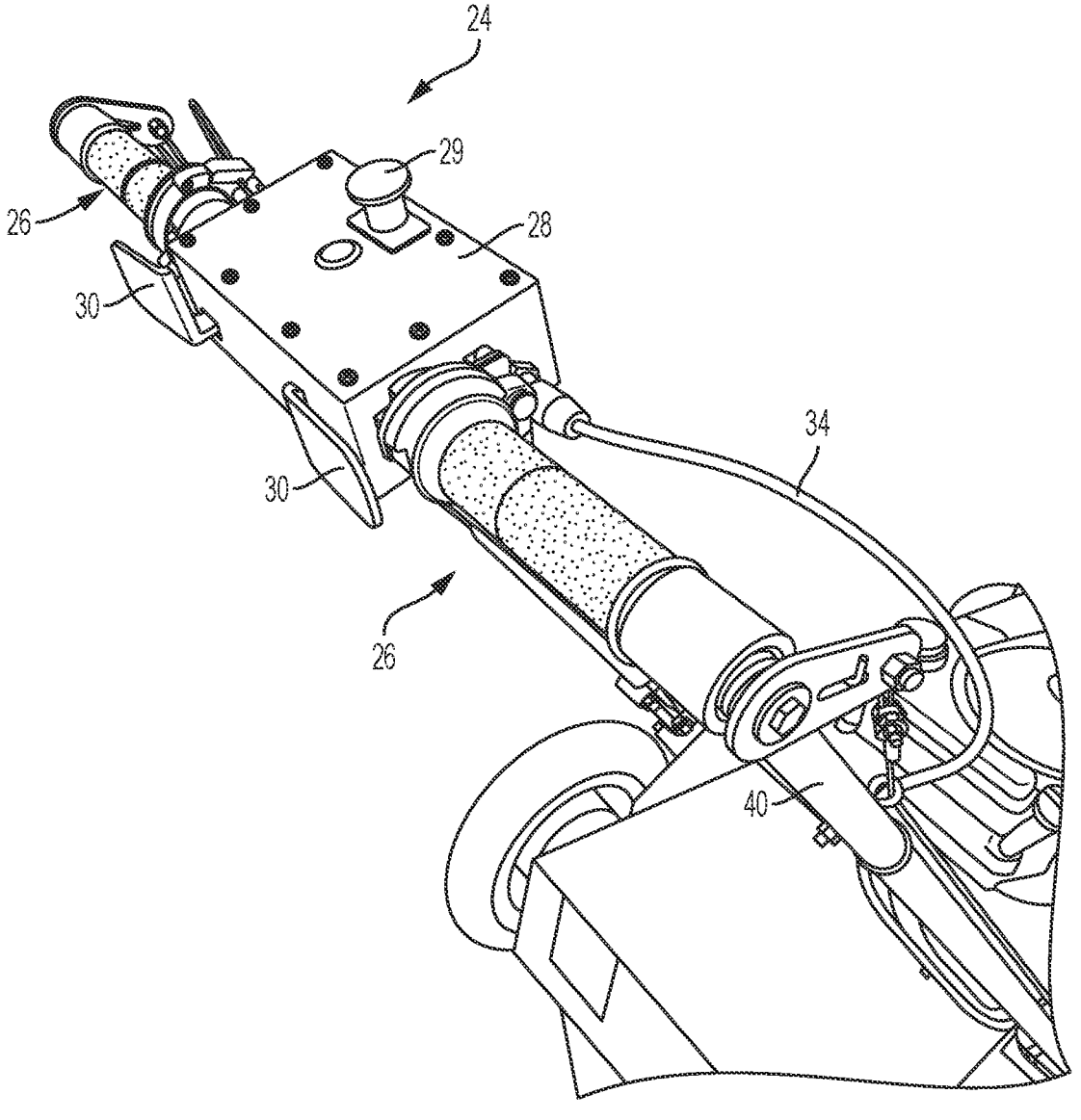
FIG. 3 is a view of the handle assembly of the mower of FIG. 1.

Referring now to FIGS. 3-7, it will now be described how the mower is converted between the walk mode and riding mode. FIG. 3 shows a top portion of the handle assembly 20, referred to hereinafter as the handle bar 24. The handle bar 24 has throttle assemblies 26 at both ends of the handle bar 24. Only the right throttle assembly will be described, but it should be understood that the left throttle assembly is identical. A control panel 28 is located at a center portion of the handle bar 24. A stop button 29 is located centrally on the control panel to shut off the blade motor and/or the wheel motors when an unsafe condition is experienced. The button 29 is designed to be easily accessible and durable so that the user can quickly access it in an emergency.

Figures 4A, 4B:
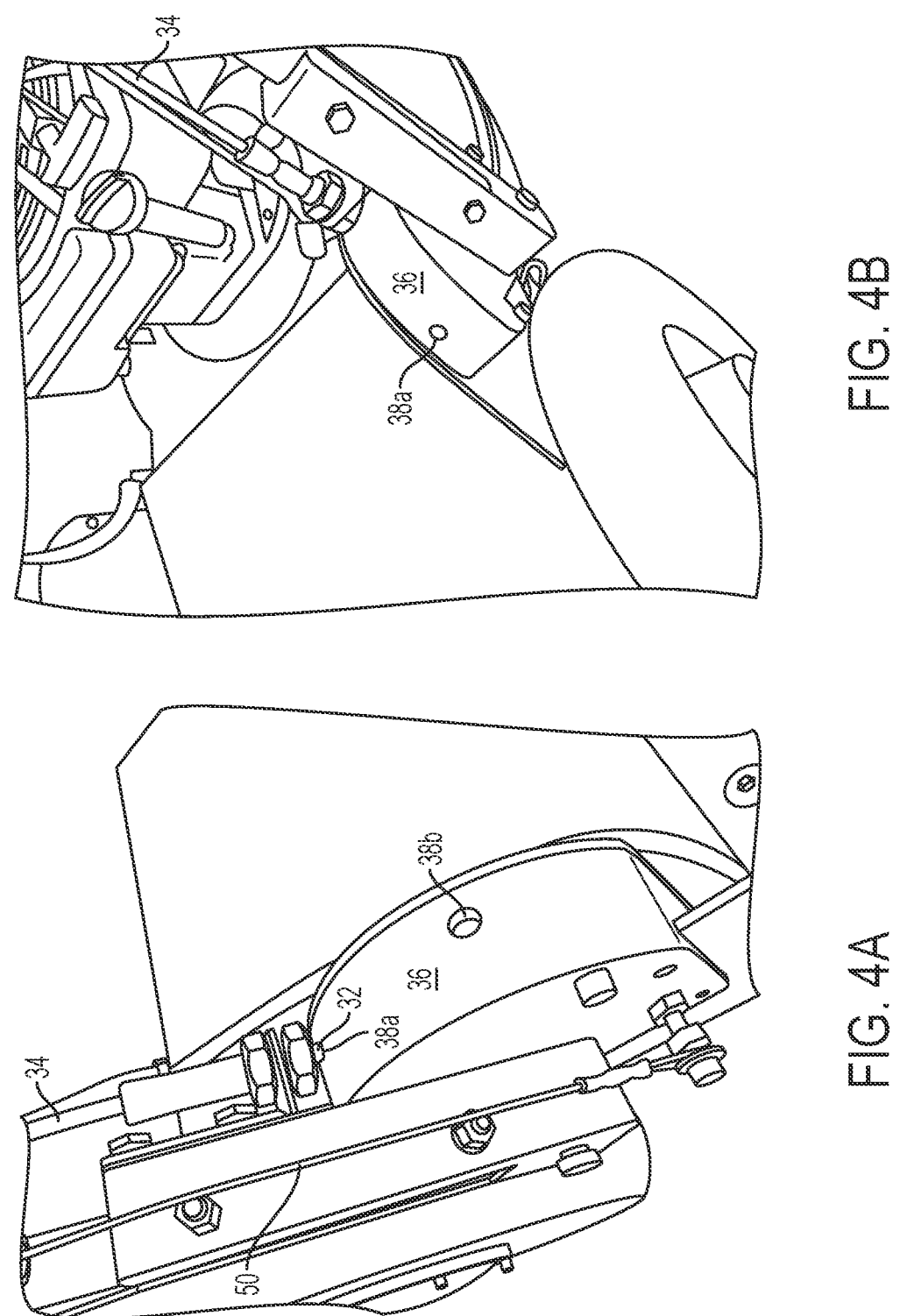
FIG. 4A is a view of the right side pivot block in the walk mode.
FIG. 4B is a view of the right side pivot block in the ride mode.

Two paddles 30 extend out from the control panel 28. The paddles 30 are connected through a Bowden cable 34 to a locking pin 32 that is inserted into one of two holes on a pivot block 36 (see FIGS. 4A and 4B). FIG. 4A shows the locking pin 32 inserted into aperture 38a in the pivot block 36 when the mower is in the walk mode, and FIG. 4B shows the locking pin 32 inserted into the aperture 38b when the mower is in the riding mode. Although only the right pivot block 36 is shown, an identical pivot block is included on the other side of the mower.

The handle assembly 20 includes the handle bar 24 and two arms 40 that extend down from the handle bar 24 to pivotably connect it to the pivot block 36. When the locking pin 32 in released from the pivot block 36, the arms 40 are able to pivot relative to the pivot block 36 allowing the locking pin 32 to move between the two apertures 38*a* and 38*b*. Both paddles must be depressed to pull the locking pin 32 out of the apertures on the pivot blocks 36 on both sides of the mower. This is to insure that the user has both hands on the handle bar and is in control of the mower.

Figure 5:
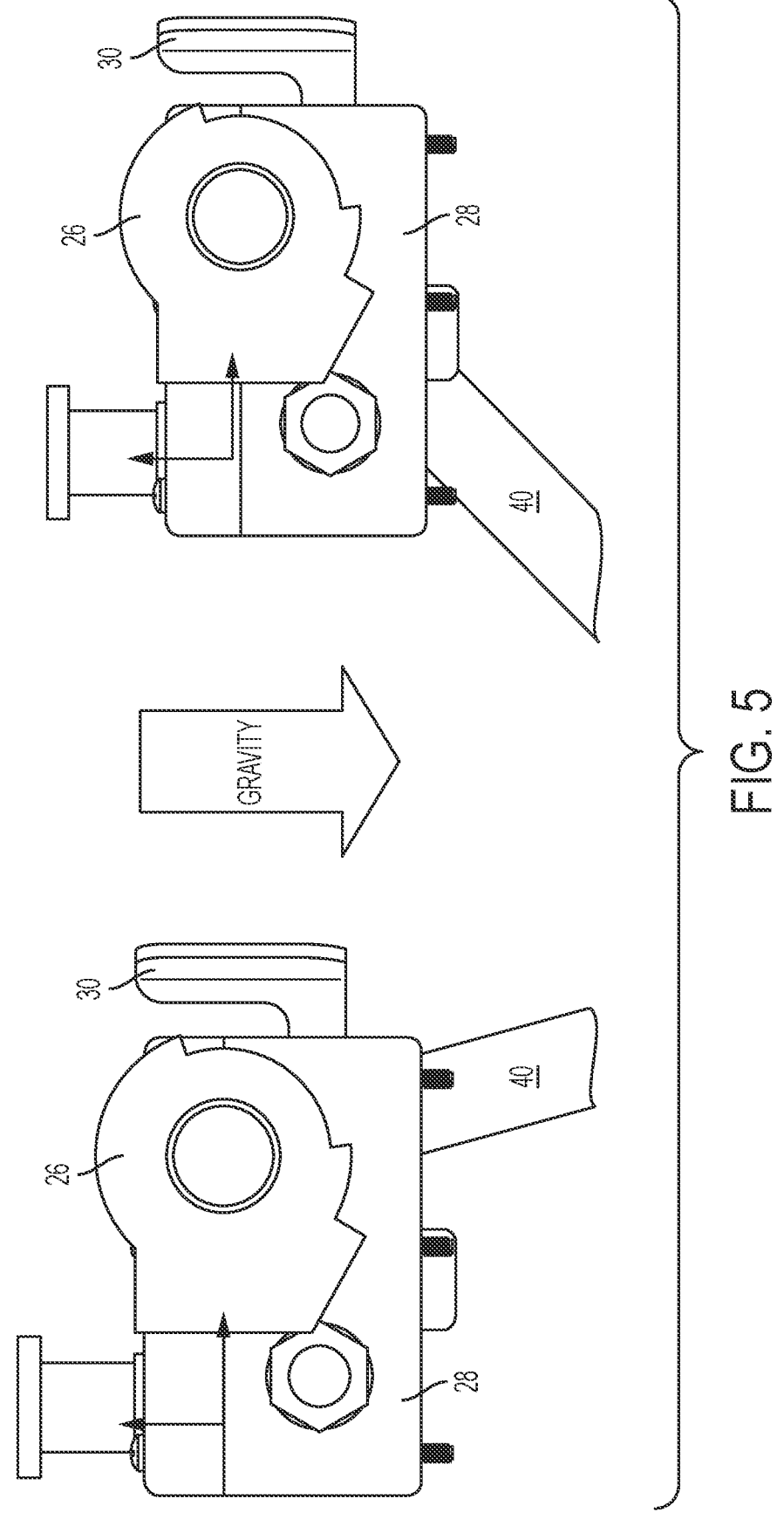
FIG. 5 is a side view of the handle assembly in both the walk mode and ride mode.
Figure 6:
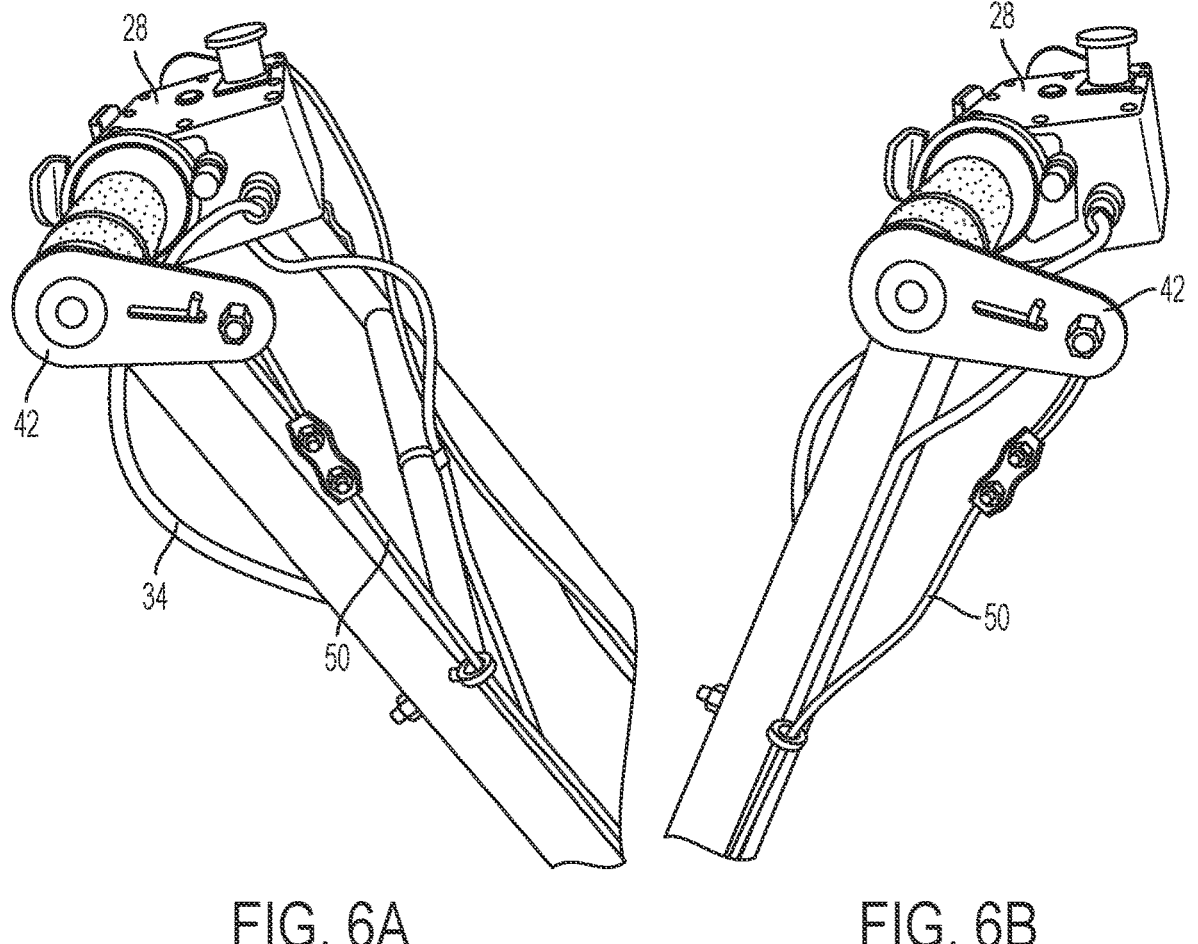
FIG. 6A is a view of the handle assembly in the walk mode.
FIG. 6B is a view of the handle assembly in the ride mode.

When the handle assembly 20 is pivoted between its two positions, the handle bar 24 itself rotates about its central axis. This allows the control panel 28 and importantly, the throttle 26, to rotate with the user's hand during the transition and maintain a constant throttle position. If the handle bar 24 and the throttle 26 did not rotate, the user's fixed grip on the throttle 26 would rotate the throttle 26, increasing or decreasing the speed of the mower. This is best shown in FIG. 5, which is a simplified left side view of the handle assembly 20 showing it in the ride mode (left side image) and walk mode (right side image). Here the rotational position of the control panel 28 and throttle 26 remains stable, eg. substantially parallel to the ground in both modes.

Figure 7:
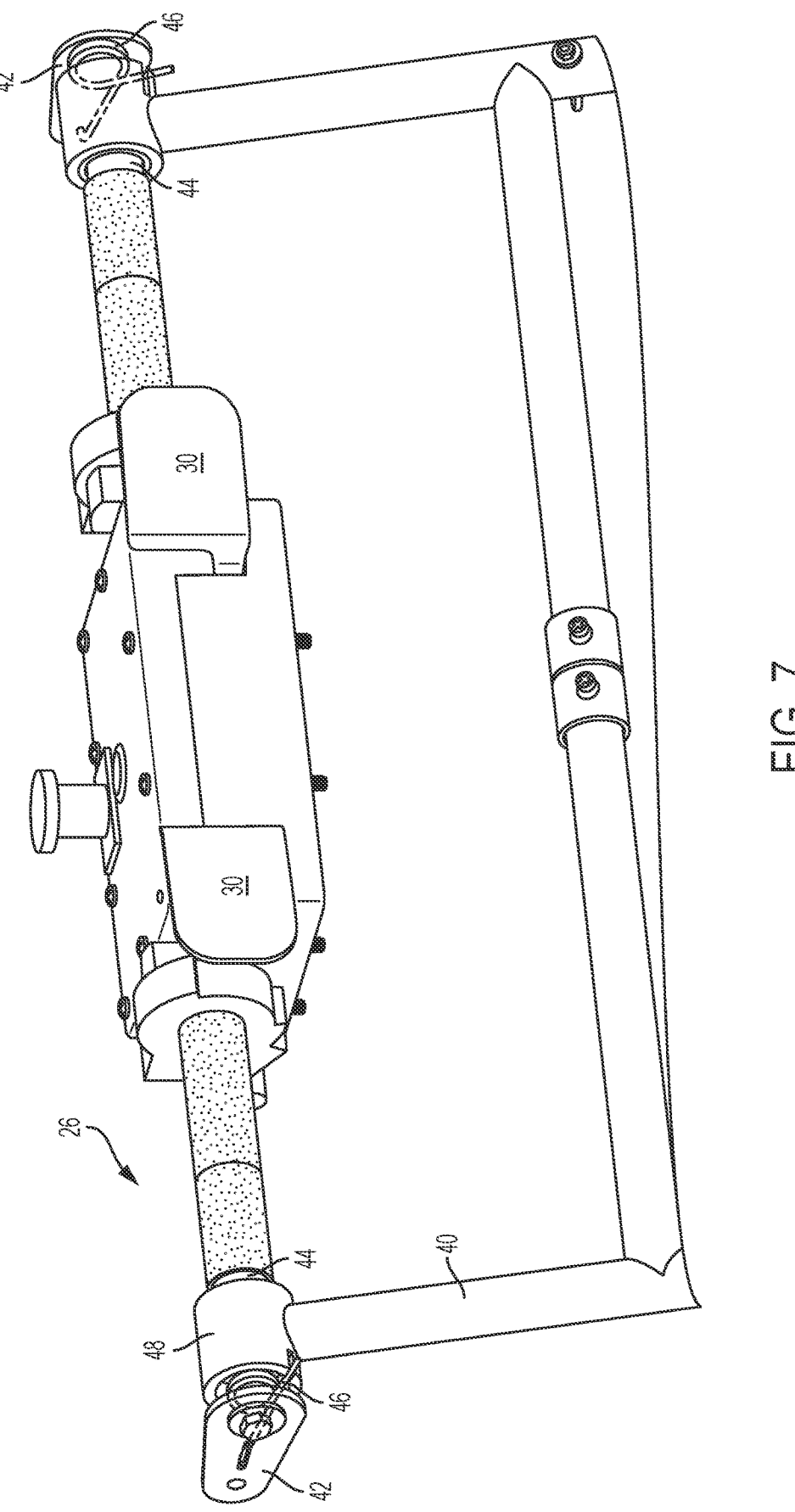
FIG. 7 is a rear view of the handle assembly.

Reference is now made to FIGS. 6A, 6B and 7 to show how the rotational position of the handle bar 24 is maintained. FIG. 6A shows the handle assembly 20 in the walk mode and FIG. 6B shows the handle assembly 20 in the ride mode. FIG. 7 shows a rear view of the handle bar 26. The figures show an oval-shaped pivot arm 42 attached at both ends of the handle bar 24, more specifically, fixedly secured to a cross bar 44 that extends across the length of the handle assembly. The cross bar 44 extends through a collar 48 of the arm 40. The pivot arm 42 is connected to a torsion spring 46 (FIG. 7) that biases the pivot arm 42 relative to the collar 48. A tension cable 50 (shown in FIGS. 6A and 6B) is attached to an end of the pivot arm 42 and is secured at the other end to the pivot block 36 (see FIG. 4).

When the handle assembly is in the walk position shown in FIG. 6A, the tension cable 50 acts against the biasing force of the torsion spring 46, pulling the pivot arm 42 in a clockwise direction. When the handle assembly is transitioned to the riding position as shown in FIG. 6B, the tension cable 50 becomes slack and no longer acts on the pivot arm 42. The biasing force of the spring 46 then moves the pivot arm 42 in the counter-clockwise direction and maintains the angular position of the cross bar 44 (and consequently, the handle bar 24) relative to the user during the transition.

When the mower is transitioned back to the walk position, the pivot arm 42 pulls on the tension cable 50 until the tension cable is taught again, at which time it forces the pivot arm 42 to rotate in the clockwise direction against the biasing force of the spring 46.

The control panel 28 and the throttle 26 are secured to the cross bar 44, and therefore rotation of the pivot arms 42 rotates the throttle 26 and control panel 28 to maintain their angular position relative to the user during the transition. This allows the user to keep his hands on the throttle 26 without changing the throttle position. FIGS. 8A and 8B shows the angular position of the user's hands in the two handle assembly positions and shows that they are substantially the same in both.

Figures 9A, 9B, 9C:
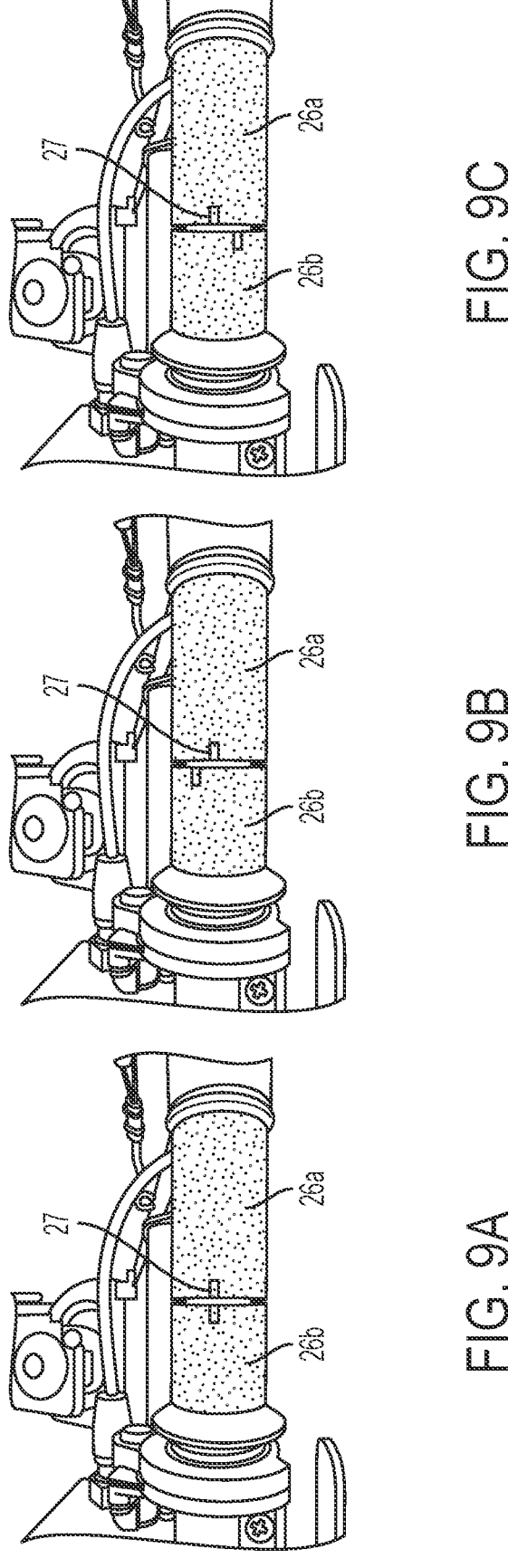
FIG. 9A is a view of a throttle in a neutral position.
FIG. 9B is a view of a throttle in a forward position.
FIG. 9C is a view of a throttle in a reverse position.

The operation of the throttle 26 will now be described in reference to FIGS. 9A-9C. The throttle 26 is split into two sections 26A and 26B. Section 26A is fixed to the cross bar

44 while section 26B is allowed to rotate. Throttle section 26B can be rotated in both a forward and reverse direction and controls power to the rear wheel motors 64 and 66. The throttle sections include a line marker 27 to indicate the position of the throttle sections relative to one another.

When the two throttle sections 26*a* and 26*b* are aligned, eg. the dashed lines are aligned, the throttle is in the neutral position and no power is delivered to the wheel motors 64 and 66. Movement of the throttle section 26*b* forward powers the wheels in a forward direction (FIG. 9B), and movement of the throttle section 26*b* in a rearward direction (FIG. 9C) powers the wheels in a reverse direction. The present throttle allows the user to seamlessly switch from moving forward and reverse without having to switch gears or flip a switch. Each of the throttles 26 control the rear wheels independently, with the left handed throttle controlling the left rear wheel, and the right handed throttle controlling the right rear wheel. A spring (not shown) is connected to the throttle section 26*b* to bias it back to its neutral position.

In order to move forward, the user would rotate both throttle sections 26*b* in the forward direction. Similarly, to go in reverse, the user would rotate both throttle sections 26*b* rearwardly. In order to turn right, the user would rotate the right handle throttle section 26*b* in reverse and the left handed throttle section 26*b* forward. This would result in a zero radius right turn about the rear wheels. To make a left turn, the throttle sections 26*b* would be rotated in the opposite directions.

The use of a split throttle allows the user to firmly grasp the fixed throttle section 26*a* while using one or two fingers (eg. the thumb and/or pointer finger) to control the throttle section 26B. In this way, the user can also release the throttle section 26B without fully releasing the handle bar 24 for greater control. Furthermore, the user can "lock" the position of the throttle section 26*b* relative to the fixed throttle section 26*a* by placing his hand over the split between the two throttle sections. This effectively "locks" the throttle section 26*b* relative to throttle section 26*a* and provides a constant speed. This is helpful when going over bumps or going up and down hills and avoids what is commonly referred to as "bump steer." Bump steer is when the vehicle hits a bump and causes an unintended movement of the throttle resulting in a sudden and unexpected changes of speed.

The throttles 26 are connected to a potentiometer circuit 25, which provides signals to a controller 60, which then controls the wheel motors. FIGS. 10A-10C show the corresponding circuits relative to the throttle positions shown in FIGS. 9A-9C. The circuit 25 includes a resistor 90 having a resistor divider 92 that is capable of changing the resistance of the circuit. For example, in FIG. 10A, where the throttle section 26B is in the neutral position, the resistor divider 92 is set in the middle of the resistor 90 and the potentiometer may be set to 2.5 kohm. In FIG. 10B where the throttle section 26B is in the forward position, the resistor divider 92 is at the bottom of the resistor 90 and the potentiometer is set at 0 ohm. In FIG. 10C where the throttle section 26B is in the reverse position, the resistor divider 92 is at the top of the resistor 90 and the potentiometer is set at 5 kohm.

Figure 4C:
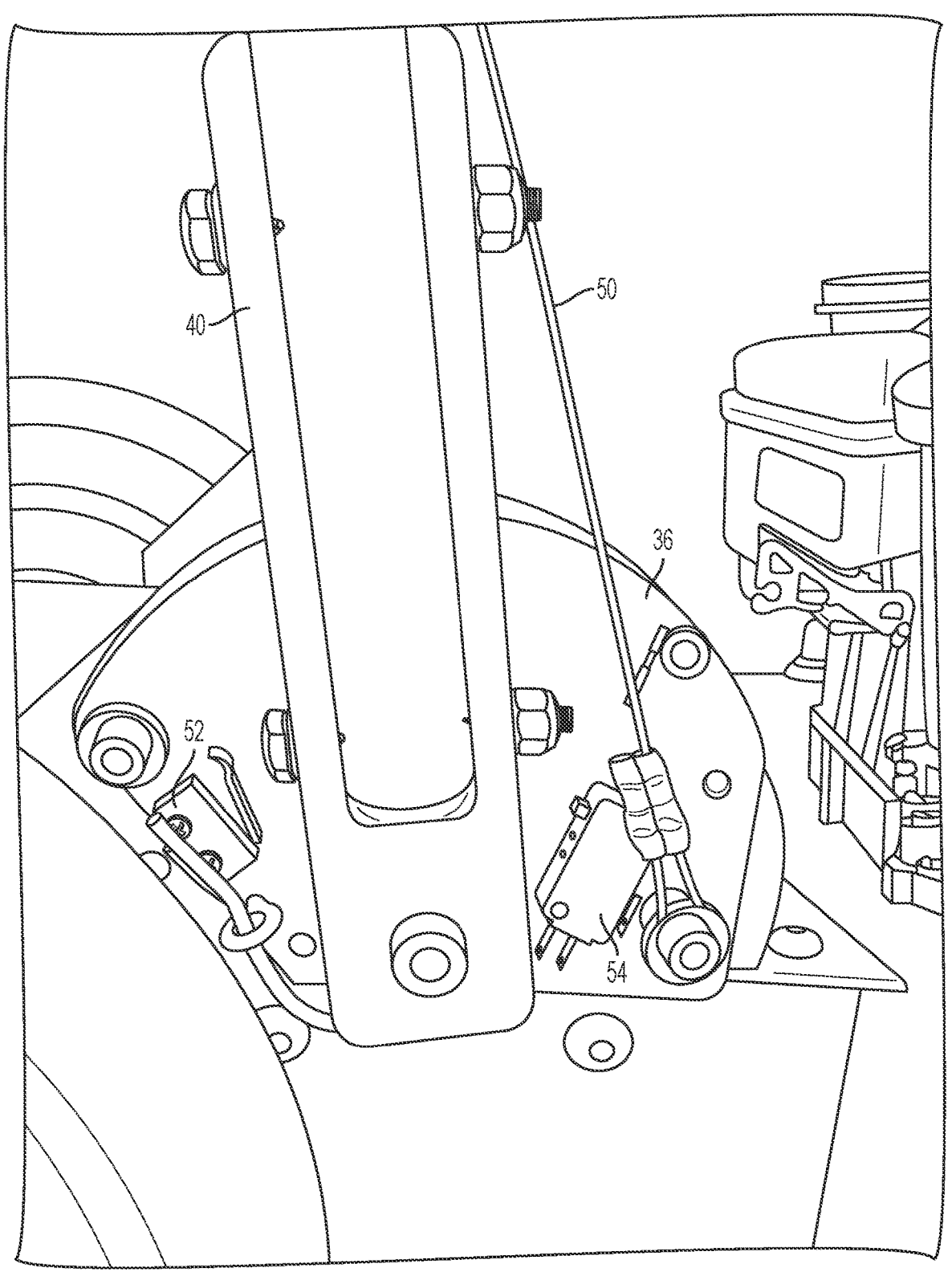
FIG. 4C is a view of the right side pivot block in transition between the walk mode and the ride mode.

FIG. 4C shows an another embodiment of the pivot block 36, which is identical to the version shown in FIGS. 4A and 4B, but includes switches to indicate the position of the pivot arm 40. The pivot block 36 includes a first switch 52 that is actuated when the arm 40 is positioned rearwardly in the walk mode. The switch 52 is connected to an indicator, such as a light, that indicates that the handle assembly 20 is properly positioned in the walk mode. A second switch 54 is positioned on the pivot block 36 on an opposite side of the arm 40 and is actuated when the arm 40 is in a forward position ride mode. The second switch 54 can also be connected to an indicator to show that the handle assembly 20 is properly positioned in the ride mode.

In addition to indicating the mode, the switches 52 and 54 can be connected to a controller to control various operational aspects of the mower. For example, the switches 52 and 54 can limit the speed of the wheel motors, as applicable. For example, when the mower is in the walk mode, the switch 52 can set a maximum speed that does not exceed the walking speed of a user. The switch 52 may also prevent the mower from going in reverse so as not to ride over the user. The switch 52 may also provide a "push" mode so that minor rotations of the throttle 26 do not actuate the wheel motors. This allows the mower to be physically pushed by the user without unintentional and minor throttle inputs driving the rear wheels and the user losing control of the mower. This allows for greater manual user control in small spaces and quick forward and reverse directional changes. By way of example, throttle rotations below ⅓ of the total rotational range would not actuate the rear wheel motors. It should also be understood that with these electronic controls, the settings described above, such as the maximum speed or the push mode throttle ranges can be programmed by the user during initial set-up of the mower.

When the mower is in the ride mode, the switch 54 can send a signal to the motor allowing it to exceed its maximum speed since the user is no longer walking behind the mower and disable the other settings established for the walk mode as described above.

It is noted that FIG. 4C shows the arm 40 in a transitional position between the walk mode and ride mode, when neither switch 52 or 54 is actuated. In this situation, a controller can recognize that no switch is actuated and prevent power from being delivered to the wheel motors to prevent accidental movement of the mower while it transitions between modes.

A further embodiment of the invention includes a pressure switch 62 (FIG. 11) under the platform 22 of the mower. The pressure switch 62 indicates whether a user is standing on the mower while in the ride mode and that the user is sufficiently heavy. This would prevent the mower from operating if a user were not present and/or if a light weight child were riding the mower. In addition to controlling the rear wheel motors, the switch 62 may also control operation of the blade engine or motor.

As explained earlier, a preferred embodiment of the mower is a hybrid system where the blade is powered by an internal combustion engine 18, and the rear wheels are powered by individual electric motors. This configuration allows a high amount of energy to be stored in the fuel and used on the portion of the mower that consumes the most energy, eg. the cutting blade, while the lower energy consuming aspect, eg. the drive wheels, is powered by the battery. Using the electric motor and battery system on the drive wheels enables fine control of the propulsion, including variable speed and reverse direction without having to change gears, slow the engine that is cutting the grass, or turn off the engine.

FIG. 11 shows a schematic of the controls for various aspects of the mower described above. A main controller 60 receives signals from various sensors and/or switches throughout the system to control the operation of the mower. The two throttles 26, each representing one of either the left hand throttle or right hand throttle provide signals as to the desired direction and speed. The pressure switch 62 indicates the presence of a user when the mower is in its ride mode. The rear wheel motors 64 and 66 are connected to the battery 68 which provides power to the motors 64 and 66. The motors 64 and 66 are also connected to the controller 60 which controls the operation of the motors. The ride mode switch 54 and the walk mode switch 52 are also electrically connected to the controller 60. The controller 60 is connected to the gas engine 18 so that under certain situations described above, it can shut off the engine 18 to prevent the blades 13 from spinning. This can be done through the use of a valve to shut of gasoline to the engine, use of a switch to shut of spark plugs by shorting them to the ground of the circuit such as the engine block, or any other known method. The controller 60 can be any microprocessor or circuit that receives the various input signals, processes those signals and then sends output signals to the various mower functions to control their operation.

FIG. 12 shows schematic of the controls of an alternative embodiment of the mower, where the gas engine has been replaced by an electric motor 70 to operate the blade 13. The battery 68, which powers the wheel motors 64 and 66, can be used to power the blade motor 70 as well. Because the blade motor 70 is electric, it can be electrically connected to the controller 60 to control its operation as described above.

Figure 13:
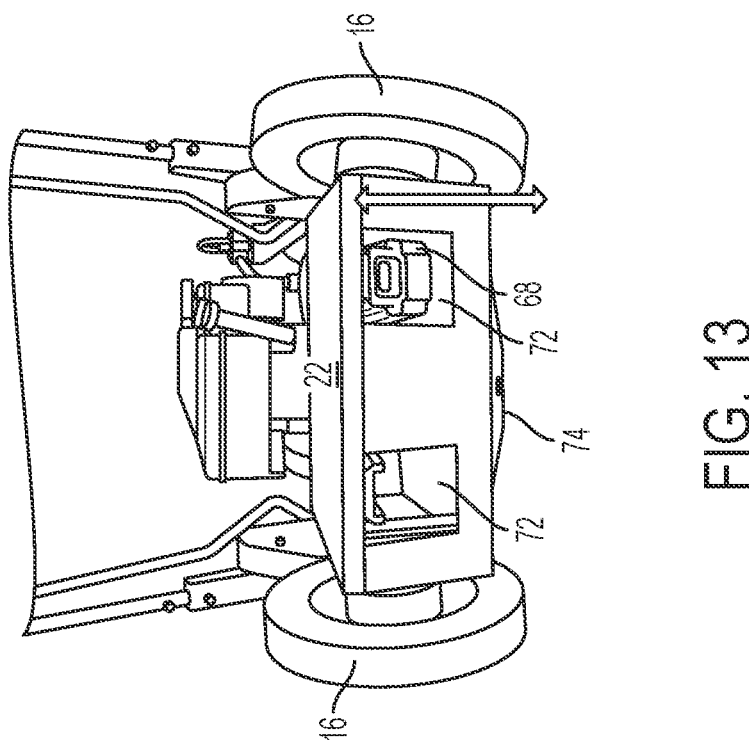
FIG. 13 is a view of the back of the mower with a raised platform.

FIG. 13 is a rear view of the mower of FIG. 1. The rear of the mower includes the platform 22, on which the user stands when riding the mower. Below the platform 22 are two compartments 72 for holding the battery 68. Although two compartments 72 are shown, only one battery 68 is shown.

Figure 14:
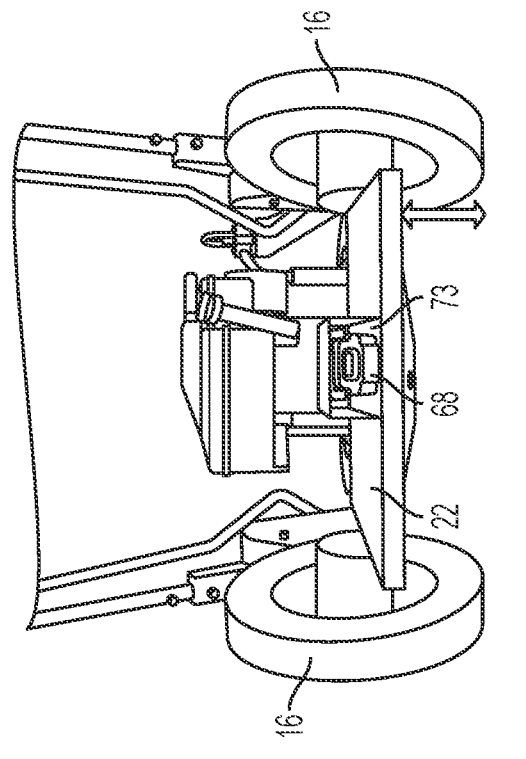
FIG. 14 is a view of the back of the mower with a lowered platform.

FIG. 14 is an alternative embodiment of the invention, where the platform 22 is lowered, making it easier for a user to step onto the platform 22. Additionally, the lower platform lowers the center-of-gravity of the mower increasing its stability, and reducing the possibility of a tip over. Having the platform 22 below the axle of the wheels 16 also improves the mower's stability and overall control. The battery 68 can be placed inside a compartment 73 on top of the platform 22 so that a user could place a foot on either side of the compartment 73.

Figure 15:
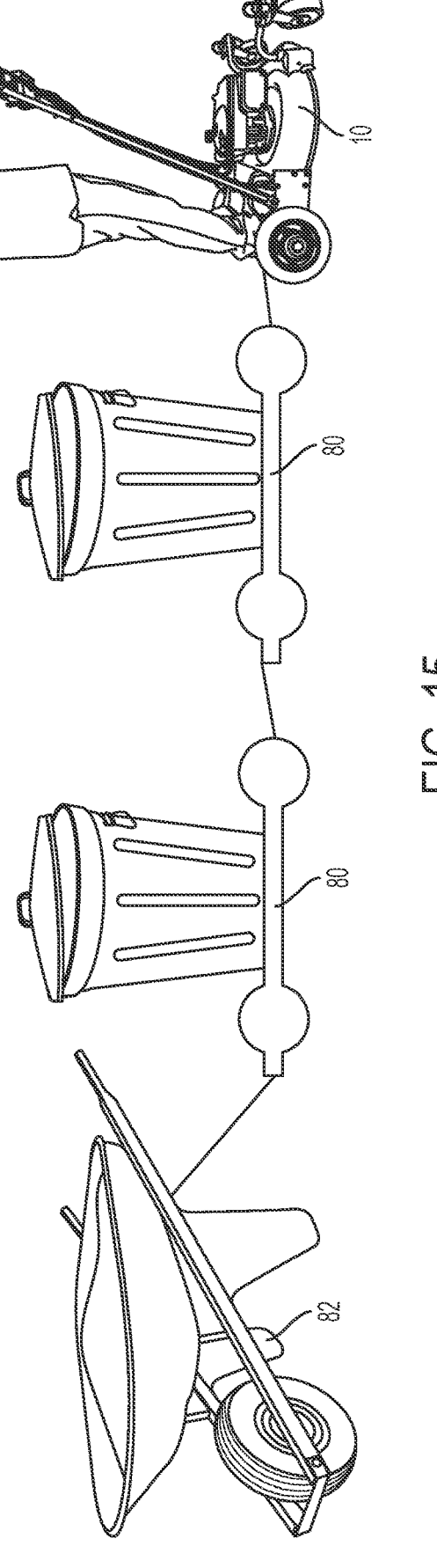
FIG. 15 shows the mower having various accessories attached.

Referring to FIGS. 13 and 15, the mower can be equipped with a hitch 74 that allows it to tow other wheeled vehicles, such as carts, wagons, spreaders, etc. This allows the mower 10 to be used as a towing or hauling device. FIG. 14 shows the mower hauling two trash can and a wheel barrow.

Another embodiment of the invention could replace the cutting blade 13 that's housed in the deck 12, with a reel type cutting blade having a bladed cylinder. Here the deck 12 could be modified to support the bladed cylinder and could be powered through the forward propulsion provided by the rear wheel motors. In this way, a gasoline engine or electric motor to power the blades would not be needed. The other aspects of the invention, including importantly, the pivotable handle assembly capable of converting the mower between the walk mode and ride mode would be the same.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. An electric lawn mower comprising:
a deck enclosing a blade therein, a plurality of wheels connected to the deck to support the deck as the electric lawn mower moves along the ground, and a platform on the deck for a user to stand on while the user controls the electric lawn mower to move along the ground, the deck having a front end and a rear end;
the platform positioned at the rear of the deck and providing a flat surface for the user to stand on;
a motor operatively connected to one of the plurality of wheels to propel the mower;
at least one battery for powering said motor, wherein the at least one battery is located underneath the platform; and
a handle assembly connected to the rear end of the deck, the handle assembly having a first position extending rearwardly to allow a user to push the lawn mower in a first mode of operation and a second position extending forwardly allowing a user to stand on the platform in a ride mode of operation.

2. The electric lawn mower of claim 1, further comprising a blade motor operatively connected to the blade, the blade motor being powered by the at least one battery.

3. The electric lawn mower of claim 1, wherein the at least one battery is removable from the mower.

4. The electric lawn mower of claim 3, wherein the platform includes at least one housing for holding the at least one battery, the at least one housing having a rearward facing opening for access to the interior of the housing.

5. The electric lawn mower of claim 1, further comprising a switch capable of detecting the presence of a rider on the platform.

6. The electric lawn mower of claim 5, further comprising a switch to detect the position of the handle assembly.

7. The electric lawn mower of claim 6, further comprising a controller connected to the switch capable of detecting the presence of a rider on the platform and the switch to detect the position of the handle assembly and for controlling operational conditions for the electric lawn mower.

8. An electric lawn mower comprising:
a deck enclosing a blade therein, a plurality of wheels connected to the deck to support the deck as the electric lawn mower moves along the ground, and a platform on the deck for a user to stand on, the deck having a front end and a rear end;
the platform positioned at the rear of the deck and providing a flat surface for the user to stand on;
a motor operatively connected to one of the plurality of wheels to propel the mower;
a housing for holding a battery, the housing being positioned underneath the platform and having a rearward facing opening for access to an interior of the housing; and
a handle assembly connected to the rear end of the deck, the handle assembly having a first position extending rearwardly to allow a user to push the lawn mower in a first mode of operation and a second position extending forwardly allowing a user to stand on the platform in a ride mode of operation.

9. The electric lawn mower of claim 8, further comprising:
a second housing for holding a second battery, the second housing being positioned underneath the platform and having a rearward facing opening for access to an interior of the second housing.

10. The electric lawn mower of claim 8, further comprising a blade motor operatively connected to the blade, the blade motor being powered by the at least one battery.

11. The electric lawn mower of claim 8, wherein the battery is removable from the housing.

12. The electric lawn mower of claim 8, further comprising a switch capable of detecting the presence of a rider on the platform.

13. The electric lawn mower of claim 8, further comprising a switch to detect the position of the handle assembly.

14. The electric lawn mower of claim 13, further comprising a controller connected to the switch to detect the position of the handle assembly and for controlling operational conditions for the electric lawn mower.

15. An electric lawn mower comprising:
a deck enclosing a blade therein, a plurality of wheels connected to the deck to support the deck as the electric lawn mower moves along the ground, and a platform on the deck for a user to stand on, the deck having a front end and a rear end;
the platform positioned at the rear of the deck and providing a flat surface for the user to stand on;
a motor operatively connected to one of the plurality of wheels to propel the mower;
a housing for holding a battery, the housing being positioned underneath the platform;
a handle assembly connected to the rear end of the deck, the handle assembly having a first position extending rearwardly to allow a user to push the lawn mower in a first mode of operation and a second position extending forwardly allowing a user to stand on the platform in a ride mode of operation; and
a switch to detect whether the handle assembly is in the first position or the second position.

16. The electric lawn mower of claim 15, further comprising a controller connected to the switch to detect whether the handle assembly is in the first position or the second position and for controlling operational conditions for the mower.

17. The electric lawn mower of claim 15, wherein the housing has a rearward facing opening for access to an interior of the housing.

18. The electric lawn mower of claim 15, further comprising a blade motor operatively connected to the blade, the blade motor being powered by the battery.

19. The electric law mower of claim 15, wherein the battery is removable from the housing.

* * * * *